United States Patent

[11] 3,616,372

| [72] | Inventors | Paul J. Kropp;<br>William F. Erman, both of Cincinnati, Ohio |
|---|---|---|
| [21] | Appl. No. | 715,163 |
| [22] | Filed | Mar. 22, 1968 |
| [45] | Patented | Oct. 26, 1971 |
| [73] | Assignee | The Procter & Gamble Company<br>Cincinnati, Ohio |

[54] PHOTOCHEMICAL SYNTHESIS OF CIS- AND TRANS-OCIMENE
3 Claims, No Drawings

| [52] | U.S. Cl. | 204/162 R |
|---|---|---|
| [51] | Int. Cl. | B01j 1/10 |
| [50] | Field of Search | 204/162 |

[56] References Cited
OTHER REFERENCES

Mayer et al., Chemical Abstracts, Vol. 61, December, 1964, p. 15567 A (QD 1A51c.2)

*Primary Examiner*—Benjamin R. Padgett
*Attorneys*—Richard C. Witte and Julius P. Filcik ABSTRACT: A process for the preparation of cis- and trans-ocimene by ultraviolet irradiation of αpinene in a photosensitizing medium to accomplish said ultraviolet transformation. The products of the process are useful as perfume components.

PHOTOCHEMICAL SYNTHESIS OF CIS- AND TRANS-OCIMENE

FIELD OF THE INVENTION

This invention relates to a novel photochemical process for obtaining cis-ocimene and trans-ocimene from α-pinene. More specifically, this invention relates to the ultraviolet irradiation of α-pinene in a photosensitizing medium to obtain mixtures of cis- and trans-ocimene, which are useful in perfume formulation, as for example in soap or detergent compositions.

In this invention on irradiation of α-pinene initially only the cis isomer of ocimene is obtained. However, upon subsequent irradiation to continue the conversion of α-pinene to cis-ocimene, the cis-ocimene formed undergoes a photosensitized equilibration with the trans isomer of ocimene. On completion this results in an approximately 1:1 mixture of cis- and trans-ocimene.

PRIOR ART

Both cis- and trans-ocimene are well known in the art. In the past ocimene has been prepared in a number of ways. F. O. Rice in U.S. Pat. No. 2,190,369 discloses the pyrolysis of α-pinene at a temperature of about 1,300° F. at an absolute pressure of 7 mm. to obtain approximately a 10 percent transformation of a α-pinene to ocimene. J. E. Hawkins and W. A. Burris in J. Org. Chem., 24, 1507–1511 (1959) isomerized α-pinene in the vapor phase over an electrically heated Nichrome spiral into ocimene, alloocimene, and dipentene. These investigators indicated that separation of the ocimene from the other isomers proved to be difficult. R. L. Blackmore in U.S. Pat. No. 3,281,485 describes the pyrolysis of α-pinene to ocimene using a heated filament and a liquid environment. This resulted in the formation of ocimene due to contact of the α-pinene with the hot filament, yet through the use of the liquid environment kept the overall reaction conditions at less than 100° C. A Boake, in Netherlands application Ser. No. 294,093 and in Belgium Pat. No. 637,707, describes a semicontinuous process for the formation of ocimene by pyrolysis of α-pinene, again over a Nichrome wire coil, to obtain racemized α-pinene, dipentene, ocimene, and alloocimene. Pyrolysis conditions were approximately 650° C. with a 60° C. overall reaction temperature. In all of the cases involving the pyrolysis of α-pinene, the pyrolysis normally was accomplished at a high temperature with a catalyst and yielded a number of products, which because of their structural similarity to ocimene were difficult to separate from the desired product.

Ocimene has also been prepared heretofore by exposure of α-pinene to γ-radiation [see T. H. Bates, J. V. F. Best and T. F. Williams, J. Chem. Soc., 1521 (1962)] with the radiation being supplied by a Van de Graaf generator, a linear accelerator or cobalt 60. Again a mixture of products was obtained with racemic α-pinene, dipentene and ocimene as well as some polymeric material primarily being obtained. R. Mayer, K. Bochow, and W. Zieger, Z. Chem., 4, 348 (1964) disclosed the irradiation of α-pinene at a 3 percent concentration in ethyl ether with ultraviolet light for 50 hours to yield cyclofenchene, dipentene, cis-ocimene at a 3 percent yield, and trans-ocimene at a 5 percent yield. The total transformation of α-pinene was only 22 percent with 14 percent being undesired isomers and 8 percent being ocimene.

Both cis- and trans-ocimene have been obtained by the dehydration of linalool, using a number of dehydration agents—notably with iodine, [see B. A. Arbusow and W. S. Abramow, Chem. Ber., 67, 1942 (1932)], with potassium hydrogen sulfate, [see M. Gunzl-Schumacher and U. Wickler, Chem. Ber., 93, 974 (1960)], by the pyrolysis of linalyl acetate [see G. Ohloff, J. Seibl and E. Sz. Kovats, Liebigs Ann. Chem., 675, 83 (1964)] and by the pyrolysis over copper at a high temperature, [see E. Klein and W. Rojahn, Chem. Ber., 97, 2401 (1964)]. In all of the previously cited cases involving the transformation of linalool or linalyl acetate, ocimene was obtained only in a small yield. The transformation of linalool to cis- and trans-ocimene has been investigated but temperatures in excess of 300° C. are necessary and under these conditions cis-ocimene is quickly converted into alloocimene and in addition relatively large quantities of dipentene are formed. A catalytic process was used in which linalyl acetate in the vapor state was contacted with acid-washed Chromosorb to undergo a catalytic pyrolysis. This catalytic pyrolysis resulted in myrcene at 43 percent yield, cis-ocimene at 20 percent yield and trans-ocimene in a 35 percent yield [see B. M. Mitzner, S. Lemberg, and E. T. Theimer, Can. J. Chem., 44, 1090–109 (1966)]. Linalool, as well as linalyl acetate, when heated with dilute organic acids, principally produces racemic linalool, d-α-terpineol, geraniol, nerol, and ocimene [see L. L. Crabalona, France et ses Parfums, 2, 28–36 (1959)].

The preparation of cis- and trans-ocimene, whether by pyrolysis, radiolysis, or dehydration, involves fairly complicated procedures for the transformation, results in a combination of products which are difficult to separate from the desired cis and trans isomers of ocimene, or is a process which results in low yields of cis- and trans-ocimene.

SUMMARY OF THE INVENTION

The process of this invention involves the steps of (1) dissolving α-pinene having the following structural formula

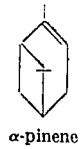

α-pinene in a photosensitizing medium, hereinafter described more fully, and (2) subjecting the photosensitizing medium containing the α-pinene to ultraviolet irradiation. This invention can be summarized according to the following schematic equation

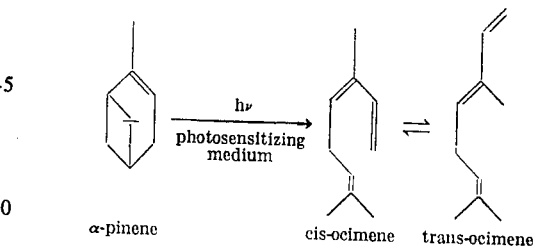

DESCRIPTION OF THE INVENTION

The transformation of α-pinene into cis-ocimene with subsequent photoequilibration to both the cis and trans isomers of ocimene occurs primarily with the formation of the cis isomer initially from α-pinene. The cis isomer then undergoes transformation as a result of continued irradiation, at a rate faster than or equal to the transformation by irradiation of α-pinene, to the cis isomer. The photoequilibration results in a mixture of approximately 1:1 of the two isomers at equilibrium. The conversion of α-pinene slows down with unconverted α-pinene remaining because the cis and trans isomers compete with the α-pinene for the irradiated energy. On completion of the conversion of α-piene to the ocimenes, i.e., where it is no longer practical to continue the irradiation due to the competition for the irradiated energy, the α-pinene remaining can be removed by methods well known in the art, recycled and subsequently irradiated to obtain larger amounts of cis- and trans-ocimene. The irradiation of the α-pinene can be stopped at a point in time earlier than the equilibrium point where it is desired to obtain cis-ocimene predominantly. However, this results in the presence of a large amount of unreacted α-pinene.

The cis isomer of ocimene formed in this transformation has a desirable odor characteristic which imparts an earthy note to perfume formulations. The trans isomer has similar odor characteristics. In addition α-pinene also has desirable odor characteristics and where unconverted α-pinene remains in the product mixture, as for example where the irradiation is stopped at an early point in the irradiation process, this will frequently cause no problems in the use of cis- and trans-ocimene in perfumery because traditionally perfume compositions which contain ocimene will usually also contain α-pinene. The process affords a simple way of obtaining cis- and trans-ocimene as a separate mixture or in combination with α-pinene. Where it is desired to use the individual isomers separately, they can be separated using usual well-known techniques, e.g., distillation or preparative gas chromatography. Thus, this invention is an efficient and useful process for the production of cis- and trans-ocimene from α-pinene. Additionally, it is a relatively inexpensive process since α-pinene is a naturally occurring material as the major constituent of most turpentines and is available in large quantities commercially.

The irradiation of α-pinene to yield these two isomers is a very simple and "clean" process in that all that is needed is an ultraviolet irradiation source, a photosensitizing medium, and a container (for the α-pinene, the photosensitizing medium and the products during irradiation) which allows the transmission of ultraviolet light. Almost no volatile byproducts are obtained in the irradiation of α-pinene, i.e., those which interfere with recovery of the ocimenes.

Even in situations wherein the irradiation is stopped before equilibrium is reached, the presence of α-pinene, although not desired from the standpoint of yields of cis- and trans-ocimene, is not a problem since all three components frequently can be used together in perfume formations and since all three of these materials can be separated, where desired, by well-known methods. In fact the ocimenes are easily separated from the unconverted α-pinene and the α-pinene can be recycled to obtain better yields of the ocimenes. Where α-pinene, cis-ocimene and trans-ocimene are to be used in perfume formulation, one skilled in the art can adjust for the presence of the α-pinene in the perfume material containing the cis- and trans-ocimene with little difficulty.

When carrying out the irradiation of the α-pinene to obtain the cis- and trans-ocimenes, any convenient source of ultraviolet radiation can be used, i.e., a light source that emits radiant energy at wavelengths distributed throughout the range of 180 mμ to about 400 mμ. Examples of radiation sources having these characteristics are zinc, cadmium, thallium, gallium, indium, carbon, mercury, zirconium, hydrogen, deuterium, xenon, and helium lamps. The light source used will depend on the particular conditions of the conversion, e.g., on a number of factors such as the solvent used, the amount of α-pinene used, and the photosensitizing medium used.

Examples of irradiation sources which are readily and commercially available are the high- and medium-pressure mercury arc lamps, i.e., lamps having a power capacity rating of about 50 watts to about 10,000 watts, preferably having a rating of about 100 to about 1,000 watts, and these will generate the desired spectral characteristics and are particularly useful as convenient sources of ultraviolet radiation for use in the process of this invention. In addition to the high- and medium-pressure mercury arc lamps, commercially available low-pressure mercury lamps also can be used in the process of this invention, for example, those having a power capacity ranging from about 0.5 watts to about 50 watts. These lamps have their principal emission around 253.7 mμ. Other common sources of ultraviolet irradiation over and above the hereinbefore described sources which are effective in converting α-pinene to ocimene are the so-called "black lights" having a maximum irradiation at about 355 mμ, "sunlight" lamps having an irradiation maximum at about 310 mμ, typical fluorescent lamps which emit light extending into the ultraviolet and sunlight which has a spectral range extending into the ultraviolet region.

In addition to the hereinbefore described ultraviolet light sources, immersion lamps which can be actually inserted into the reaction flask to irradiate the sample of α-pinene are acceptable as ultraviolet light sources for the purposes of this invention. When this type of irradiation source is used, the irradiation may be carried on in any type of reaction vessel or container.

The reaction vessels which can be used to contain the α-pinene during irradiation with the usual type of external ultraviolet irradiation sources can be simply any container which allows the transmission of light of the desired wavelengths, e.g., quartz, Vycor, Corex, Pyrex and soft glass reaction vessels can be used. The choice of the vessel is similar to the situation with the light source and will depend on the conditions of the reaction. Pyrex reaction vessels are generally preferred for this type of photochemical transformation because of their ready availability.

The use of a photosensitizing medium to effect the transformation from α-pinene to the cis and trans isomers of ocimene is necessary. The photosensitizing medium absorbs the emitted spectral radiation energy provided by the light source and transfers this energy to the α-pinene converting it to cis-ocimene.

The photosensitizing medium can be a solvent which itself has the requisite property of serving as a photosensitizing medium or the photosensitizing medium can be an inert solvent plus an added photosensitizing agent, hereinafter described. (An inert solvent in this context means a nonphotosensitizing solvent rather than the usual connotation of an unreactive solvent—although for the purposes of this invention the solvent, whether photosensitizing or inert, will also be unreactive.)

Examples of solvents which are inert, i.e., those which must have photosensitizing agents added to them for effectiveness as a photosensitizing medium, are the aliphatic hydrocarbons having from 5 to about 15 carbon atoms, alcohols having from 1 to about 15 carbon atoms, ethers having from 2 to about 15 carbon atoms, and glycols having from 2 to about 15 carbon atoms. The only limitation is that the solution be homogeneous. In essence any inert solvent which is liquid at the temperature of operation can be successfully employed in the process of this invention, providing it does not absorb strongly within the absorption region of the added photosensitizing agent added to convert the inert solvent to a photosensitizing medium.

Examples of aliphatic hydrocarbons which can be used as inert solvents are pentane, hexane, octane, decane, dodecane, and pentadecane. Cyclic hydrocarbons can also be used, for example, cyclopentane, cyclohexane, and cyclooctane.

Examples of aliphatic alcohols which can be used as inert solvents are methanol, ethanol, propanol, isopropanol, butanol, octanol, decanol, and pentadecanol.

Ethers can also be successfully employed as the inert solvent in the process of this invention. Examples of ethers which can be used are diethyl ether, dibutyl ether, dioxane, and 1,2-dimethoxyethane.

Glycols can also be used as inert solvents. Examples of suitable glycols are ethylene glycol, propylene glycol and butylene glycol.

The aliphatic hydrocarbons such as pentane and hexane and the aliphatic alcohols such as methanol, ethanol and isopropanol are preferred as inert solvents because of their ready availability.

Examples of photosensitizing agents which can be used for the purposes of this invention to convert the inert solvents to a photosensitizing medium are the aromatic hydrocarbons such as benzene, toluene, xylene, and mesitylene. Other examples of photosensitizing agents are the dialkyl, diaryl, and alkylaryl ketones, as for example, acetophenone, acetone, benzophenone, diisopropyl ketone, as well as the aryl aldehydes such as benzaldehyde. Other photosensitizers which can be used are phenol, aniline, benzonitrile, benzoic acid, xanthone, hexachlorobenzene, and triphenylamine. These photosensitizing agents are set out in more detail in N. J. Turro, Molecular Photochemistry, W. A. Benjamin, Inc., New York (1965), p. 132. In addition to the above photosensitizing agents, polymeric materials such as polyphenylvinyl ketone as is described by P. A. Leermakers and F. C. James in J. Org. Chem., 32, 2898 (1967), can also be used.

It should be pointed out that in some cases the photosensitizing agent can act as the solvent itself. For example, benzene, toluene, xylene, mesitylene, hexachlorobenzene, acetophenone, and acetone can not only act as a solvent but also have the properties of a photosensitizing agent. Where this situation exists there is no need to add any additional photosensitizing agent to the solvent nor conversely to employ an inert solvent with the photosensitizing agent since the transfer of the radiated energy to the α-pinene will be accomplished.

The choice of the photosensitizing agent will for the most part be determined by its efficiency characteristics. These are well documented in the literature and one skilled in the art can select the photosensitizing agent, whether to be added to the inert solvent or used as the solvent (e.g., an aromatic hydrocarbon) which will transfer the greatest amount of irradiated energy. The inert solvent used can play an important part in the choice of the photosensitizing agent. The spectral characteristics of the inert solvent, where not acting as a photosensitizing medium per se, may determine that a more or lesser effective photosensitizing agent can be used to obtain the desired results, i.e., where the solvent has favorable energy transmission characteristics, a lesser efficient photosensitizing agent can be used and vice versa.

The photosensitizing agents which are preferred for the purposes of this invention are benzene, toluene, xylene, mesitylene and acetone (which have the obvious advantage of acting as the solvent in addition) as well as benzophenone, acetophenone, propiophenone, and xanthone.

The α-pinene can be dissolved in the solvent, i.e., the photosensitizing medium, at a concentration of about 0.1 percent to about 75 percent, preferably at about 1 percent to about 20 percent. Any concentration, however, can be used as long as a homogeneous mixture is obtained.

The irradiation of α-pinene is preferably carried out in the absence of air or oxygen, e.g., under a blanket or argon, nitrogen, or helium. This is not a critical consideration. However, operation in the absence of air or oxygen will facilitate the reaction and minimize any side reactions which might occur. The reaction is also normally carried out with the solvent system being agitated. This can be easily accomplished by bubbling an inert gas, normally the one blanketing the system, through the mixture during the period of irradiation.

A range of temperatures for irradiation can be used since the irradiation reaction is primarily photochemical in nature rather than thermal. Thus the reaction temperatures can vary widely, as for example from about −40° C. to about 100° C., with a preferred temperature range being at about or just above room temperature, e.g., from 20° C. to about 35° C. Where it is desired to conduct the reaction at room temperature, a water bath, fan or the like can be used to control the reaction at room temperature since irradiation with a mercury arc lamp or other ultraviolet source may cause a temperature rise due to the energy emitted in the form of heat.

The reaction time normally required to reach completion is from about 1 minute to about 24 hours, more normally in the neighborhood of about 2 hours. The reaction time required to effect the transformation will depend again upon the photosensitizing agent used, the efficiency of the ultraviolet irradiation source, the solvent used, and the reaction vessel used. The point at which no greater yield can be obtained on continued irradiation can be determined by typical gas chromatographic techniques in accordance with methods well known in the art. If it is desired to separate the components at completion, i.e., the α-pinene from cis-ocimene and from trans-ocimene, this can be accomplished by distillation. Where it is desired to separate the two isomers, either before or after the removal of the α-pinene, preparative gas chromatography or fractional distillation can be used. As has already been indicated the separation of the components may not be necessary since all three components can be used in the perfume art.

The components obtained as a result of irradiation of α-pinene, e.g., cis-ocimene and trans-ocimene, can be used individually or in admixture with each other as odorants per se or as components with other odorants in perfume compositions which find ultimate use in products such as soaps, detergents, deodorants, shampoos and the like at a level of from about 0.1 percent to about 20 percent normally at about 0.2 percent to about 2 percent. Perfume compositions containing odoriferously effective amounts, e.g., 0.0001 percent to about 50 percent, of any of the above-described perfume components are desirable and useful. More specific illustrations of the perfume utility of the cis and trans isomers of ocimene can be found in the examples hereinafter.

EXAMPLES

General Procedure

The following examples illustrate the specific preferred embodiments of this invention and are not intended to be limiting. All percentages and ratios in the following examples, as well as in the specification and the appended claims, are by weight, unless otherwise indicated. Temperatures are expressed in degrees centigrade.

Data listed in all of the examples were obtained by means of the following techniques unless otherwise indicated. The infrared spectra were recorded on a Perkin-Elmer Infracord spectrophotometer. The nuclear magnetic resonance spectra were obtained on a Varian HA-100 spectrometer using tetramethylsilane as an internal reference. Chemical shifts are recorded as parts per million on the $\tau$ scale and coupling constants as Hertz. Nuclear magnetic resonance data are recorded in the order: chemical shift, multiplicity (where $s$=singlet, $d$ = doublet, $t$ = triplet, $q$ = quartet, and $m$ = multiplet), coupling constant and interpretation. Gas chromatographic separations were made on a 10-ft. × 0.25-in. stainless steel column packed with 20 percent GE–SF–96 silicone oil on Anakrome ABS 300 or 20 percent Carbowax 20M on 60/80 mesh Chromosorb W using an Aerograph 90–P unit. The specific rotations were obtained on a Rudulph Model 70 precision polarimeter with chloroform as the solvent.

EXAMPLE I

A solution of 1.502 g. of α-pinene $[\alpha]_D$ +48° (neat), +54.8° (c 2.37, CHCl$_3$) was dissolved in 150 ml. of benzene as the photosensitizing medium. The above solution was irradiated for 60 min. with a 450-watt medium-pressure mercury arc lamp (Hanovia) equipped with a Vycor filter. The benzene was removed under reduced pressure and the residual oil, 1.644 g., was subjected to short-path distillation yielding 495 mg. (33 percent) of a colorless liquid, b.p. 140°–170° C. (110 mm. Hg). This liquid contained 60 percent unconverted α-pinene, 17 percent cis-ocimene and 23 percent trans-ocimene.

The above three compounds were isolated by preparative gas chromatography on a GE–SF–96 silicone oil packed column at 85° and 60 cc./min. helium flow. The α-pinene recovered, gas chromatographic retention time 10.4 min., had $[\alpha]_D^{25}$ +54.6° (c 1.50, CHCl$_3$).

cis-Ocimene was isolated as a colorless liquid: retention time, 18.7 min.; ir (CCl$_4$) 6.08 (nonconjugated olefin), 6.25 (conjugated olefin), 10.15 and 11.05 $\mu$ (RCH=CH$_2$); n.m.r. (CDCl$_3$) 3.35 (q, $J_1$=17 Hz., $J_2$=14 Hz., C-2 proton), 4.65–5.1 (m, C-1, −4, and −6 olefinic protons), 7.22 (t, $J_1$=$J_2$=6.7, C-5 methylene protons), 8.24, 8.34, and 8.40 (singlets, olefinic methyl groups). The gas chromatographic retention time and infrared and n.m.r. spectra of the cis-ocimene and those of an authentic sample were identical.

trans-Ocimene was isolated as a colorless liquid: gas chromatographic retention time, 20.4 min.; ir (CCl$_4$): 6.10 (nonconjugated olefin), 6.22 (conjugated olefin), and 10.14 and 11.19 μ (RCH=CH$_2$); n.m.r. (CDCl$_3$) 3.80 (q, J$_1$=17.0, J$_2$=12.0, C-2 olefinic proton), 4.7-5.2 (m, C-1 and —4 protons), 7.25 (t, J$_1$=J$_2$=7.0, C-5 allylic protons), and 8.31, 8.35, and 8.41 (s, olefinic methyls). The gas chromatographic retention time and infrared and n.m.r. spectra of the above sample and those of an authentic specimen of trans-ocimene were identical.

EXAMPLE II

The procedure as indicated in example I above was repeated except that the irradiation was for a period of 3 hours. On workup there was isolated 356 mg. (24 percent) of a mixture of α-pinene (50 percent), cis-ocimene (23 percent), and trans-ocimene (27 percent).

EXAMPLE III

A solution of 3.00 gms. of α-pinene, as described in example I above, in 150 ml. of a commercial mixture of xylene isomers was irradiated for 2 hours using a 450-watt medium-pressure mercury arc lamp (Hanovia) using Vycor apparatus. The xylene was removed by distillation and the residual oil, which was colorless, was analyzed using gas chromatographic techniques as described in example I. The analysis showed the presence of α-pinene (70 percent), cis-ocimene (15 percent), and trans-ocimene (12 percent).

When in examples I, II, and III above, other solvents are substituted for the benzene or xylene on an equivalent basis or as mixtures (e.g., 1:1 mixtures) substantially equivalent results are obtained in that α-pinene is converted into cis- and trans-ocimene, e.g., toluene, mesitylene, hexachlorobenzene and acetone.

EXAMPLE IV

A solution of 3.00 gms. of α-pinene in 150 ml. of methanol with an added 3.0 ml. of xylene as the photosensitizing agent was irradiated as in example III above. The solvent and photosensitizing agent were removed by distillation and the residual oil was analyzed using gas chromatographic techniques as described in example I. On analysis by gas chromatographic techniques it was shown that α-pinene (72 percent), cis-ocimene (5 percent), and trans-ocimene (6 percent) were obtained.

When in the above example other photosensitizing agents are substituted on an equivalent basis for the xylene, substantially equivalent results are obtained in that α-pinene is converted to cis- and trans-ocimene, e.g., aromatic hydrocarbons such as benzene, toluene, mesitylene and hexachlorobenzene; aryl aldehydes such as benzaldehyde; diaryl ketones such as benzophenone; dialkyl ketones such as acetone; alkyl aryl ketones such as acetophenone and propiophenone; benzoic acid; benzonitrile; aniline; phenol; xanthone; triphenylamine; and polyphenylvinyl ketone.

When in the above example other solvents are substituted on an equivalent bases for the methanol, substantially equivalent results are obtained in that α-pinene is converted to cis- and trans-ocimene, e.g., aliphatic alcohols, such as ethanol, propanol, isopropanol, butanol, pentanol, octanol, decanol and pentadecanol; aliphatic hydrocarbons, such as pentane, hexane, heptane, octane, decane and pentadecane; cyclic hydrocarbons, such as cyclopentane, cyclohexane, cyclooctane, cyclodecane, and cyclopentadecane; ether solvents such as diethyl ether; dibutyl ether, dioxane, and 1,2-dimethoxyethane; and glycol solvents such as ethylene glycol, propylene glycol and butylene glycol.

EXAMPLE V

A solution of 3.00 grams of α-pinene in 150 ml. of benzene with an added 3.0 ml. of acetophenone as the photosensitizing agent was irradiated for 6 hours with a 450-watt medium-pressure mercury arc (Hanovia) lamp employing a Pyrex filter. The solvent and photosensitizing agent were removed by distillation yielding a colorless oil. This oil was analyzed using gas chromatographic techniques as described in example I, and it was found that α-pinene (32 percent), cis-ocimene (25 percent), and trans-ocimene (26 percent) were obtained.

When in the above example other photosensitizing agents are substituted on an equivalent basis for the acetophenone, substantially equivalent results are obtained in that α-pinene is converted to cis- and trans-ocimene, e.g., aryl aldehydes such as benzaldehyde; diaryl ketones such as benzophenone; dialkyl ketones such as acetone; propiophenone; benzoic acid; benzonitrile; aniline; phenol; xanthone; triphenylamine; and polyphenylvinyl ketone.

When in the above example other solvents are substituted on an equivalent basis for the benzene, substantially equivalent results are obtained in that α-pinene is converted to cis- and trans-ocimene, e.g., aliphatic alcohols, such as ethanol, propanol, isopropanol, butanol, pentanol, octanol, decanol and pentadecanol; aliphatic hydrocarbons, such as pentane, hexane, heptane, octane, decane, and pentadecane; cyclic hydrocarbons such as cyclopentane, cyclooctane, cyclodecane and cyclopentadecane; ether solvents such as diethyl ether, dibutyl ether, dioxane, and 1,2-dimethoxyethane; glycol solvents such as ethylene glycol, propylene glycol and butylene glycol; and aromatic hydrocarbon solvents such as xylene, toluene, mesitylene, and hexachlorobenzene.

EXAMPLE VI

The following perfume compositions are made by mixing the components shown in the amounts designated.

Composition A

Lavender Synthetic

| Component | Percent by Weight |
| --- | --- |
| Linalyl Acetate | 39.50 |
| Lavandin | 20.00 |
| Geranyl Acetate | 15.00 |
| Linalool | 10.00 |
| Terpinyl Acetate | 10.00 |
| Ethyl Amyl Ketone | 2.50 |
| Decyl Aldehyde (10%) | 1.00 |
| Borneol | 0.50 |
| Coumarin | 1.00 |
| Mixture of cis and trans isomers of ocimene (approximately 1:1)* | 0.50 |
| TOTAL | 100.00 |

*This mixture of isomers has an earthy, fruity, lavender odor.

Composition B

Lemon Synthetic

| Component | Percent by Weight |
| --- | --- |
| d-Limonene | 85.40 |
| Eucalyptol | 3.00 |
| Linalool | 1.00 |
| Camphor Gum | 0.10 |
| Iso Pulegol | 0.20 |
| Terpineol | 3.00 |
| Geraniol | 2.00 |
| Citral | 4.50 |
| BHT | 0.10 |
| Mixture of 50% cis- and trans-ocimene (approximately 1:1) and 50% α-pinene* | 0.70 |
| TOTAL | 100.00 |

*This mixture of isomers with residual α-pinene has an earthy, citrus, lavender odor.

EXAMPLE VII

Detergent Compositions

A conventional granular, heavy-duty built detergent having the following composition is prepared:

| Component | Percent by Weight |
|---|---|
| Sodium dodecyl benzene sulfonate | 20.0 |
| Sodium tripolyphosphate | 50.0 |
| Sodium silicate (SiO$_2$:Na$_2$O ratio of 2:1) | 6.0 |
| Sodium sulfate | 14.0 |
| Water | 9.8 |
| Perfume Composition A of Example VI | 0.2 |
| TOTAL | 100.0 |

The detergent composition exhibits a highly desirable lavender fragrance. Composition B of example VI can be substituted for Composition A in the above heavy-duty, built detergent. Composition B imparts a lemon fragrance to the detergent.

EXAMPLE VIII

Soap Bar Composition

A conventional household soap bar having the following composition is prepared:

| Component | Percent by Weight |
|---|---|
| Sodium soap | 75.0 |
| Potassium soap | 7.5 |
| (The total soap comprises a mixture of 80% tallow soap and 20% coconut soap.) | |
| Water | 15.0 |
| Perfume Composition A of Example VI | 2.5 |
| TOTAL | 100.0 |

This soap bar exhibits a highly desirable lavender fragrance. Composition B can be substituted for Composition A in the above soap bar composition. Composition B imparts a lemon fragrance to the soap bar.

What is claimed is:

1. A photochemical process for the preparation of cis- and trans-ocimene comprising the steps of: (a) dissolving α-pinene in a photosensitizing solvent selected from the group consisting of benzene, xylene, toluene, mesitylene, hexachlorobenzene, acetone and acetophenone; and (b) irradiating the solution obtained from (a) with ultraviolet light having a radiant energy of a wavelength in the range of from 180 μ to about 400 μ, said process being carried out at a temperature from about −40° C. to about 100° C.

2. A photochemical process for the preparation of cis- and trans-ocimene comprising the steps of: (a) dissolving α-pinene in an inert solvent containing a photosensitizing agent selected from the group consisting of aromatic hydrocarbons, aryl aldehydes, dialkyl ketones, diaryl ketones, alkylaryl ketones, benzoic acid, benzonitrile, aniline, phenol, xanthone, hexachlorobenzene and triphenylamine; and (b) irradiating the solution obtained from (a) with ultraviolet light having a radiant energy of a wavelength in the range of from 180 μ to about 400 μ, said process being carried out at a temperature from about −40° C. to about 100° C.

3. A photochemical process for the preparation of cis- and trans-ocimene comprising the steps of: (a) dissolving α-pinene in an inert solvent containing a photosensitizing agent selected from the group consisting of benzophenone, acetophenone, propiophenone, acetone, benzene, xylene, toluene and mesitylene; and (b) irradiating the solution obtained from (a) with ultraviolet light having a radiant energy of a wavelength in the range of from 180 μ to about 400 μ, said process being carried out at a temperature from about −40° C. to about 100° C.

* * * * *

UNITED STATES PATENT OFFICE
CERTIFICATE OF CORRECTION

PO-1050 (5/69)

Patent No. 3,616,372          Dated October 26, 1971

Inventor(s) Paul J. Kropp and William F. Erman

It is certified that error appears in the above-identified patent and that said Letters Patent are hereby corrected as shown below:

In the ABSTRACT, line 2, "αpinene" should be -- α-pinene --.

In Claim 1, column 10, lines 12 and 13, "180 μ to about 400 μ," should read -- 180 mμ to about 400 mμ, --.

In Claim 2, column 10, lines 23 and 24, "180 μ to about 400 μ," should read -- 180 mμ to about 400 mμ, --.

In Claim 3, column 10, line 33, "180 μ to about 400 μ," should read -- 180 mμ to about 400 mμ, --.

Signed and sealed this 18th day of April 1972.

(SEAL)
Attest:

EDWARD M. FLETCHER, JR.
Attesting Officer

ROBERT GOTTSCHALK
Commissioner of Patents